United States Patent
Shiraishi et al.

(10) Patent No.: US 12,092,072 B2
(45) Date of Patent: Sep. 17, 2024

(54) VORTEX GENERATOR FOR WIND TURBINE BLADE, WIND TURBINE BLADE AND WIND POWER GENERATING APPARATUS, AND METHOD FOR MANUFACTURING WIND TURBINE BLADE

(71) Applicant: MITSUBISHI HEAVY INDUSTRIES, LTD., Tokyo (JP)

(72) Inventors: Yasuaki Shiraishi, Tokyo (JP); Wakako Ariki, Tokyo (JP); Yoshiyuki Ueda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/038,226

(22) PCT Filed: Nov. 26, 2021

(86) PCT No.: PCT/JP2021/043327
§ 371 (c)(1),
(2) Date: May 23, 2023

(87) PCT Pub. No.: WO2022/114102
PCT Pub. Date: Jun. 2, 2022

(65) Prior Publication Data
US 2023/0417217 A1  Dec. 28, 2023

(30) Foreign Application Priority Data

Nov. 27, 2020  (JP) .................. 2020-197391

(51) Int. Cl.
*F03D 1/06*  (2006.01)

(52) U.S. Cl.
CPC ...... *F03D 1/06495* (2023.08); *F05B 2230/23* (2013.01); *F05B 2240/3062* (2020.08); *F05B 2250/33* (2013.01)

(58) Field of Classification Search
CPC .... F03D 1/0633; F03D 1/0641; F03D 7/0232; F05B 2240/301; F05B 2240/305; F05B 2240/306; F05B 2240/3062
See application file for complete search history.

(56) References Cited

U.S. PATENT DOCUMENTS

| 5,957,191 A | 9/1999 | Okada et al. |
| 8,807,940 B2 * | 8/2014 | Grabau .................. F03D 7/022 416/231 B |

(Continued)

FOREIGN PATENT DOCUMENTS

| DE | 102013201871 A1 | 8/2014 |
| EP | 2484898 A1 | 8/2012 |

(Continued)

OTHER PUBLICATIONS

International Preliminary Report on Patentability for International Application No. PCT/JP2021/043327 mailed Jun. 8, 2023; 16pp.

(Continued)

*Primary Examiner* — J. Todd Newton
*Assistant Examiner* — Cameron A Corday
(74) *Attorney, Agent, or Firm* — HAUPTMAN HAM, LLP

(57) ABSTRACT

A vortex generator for wind turbine blade is a vortex generator for wind turbine blade, the vortex generator being made of a resin, including: a platform; and at least one fin disposed projecting from an upper surface of the platform.

(Continued)

The vortex generator includes a cavity that opens to a bottom surface of the platform and extends to an inside of the fin.

14 Claims, 9 Drawing Sheets

(56) References Cited

U.S. PATENT DOCUMENTS

| | | | |
|---|---|---|---|
| 9,759,186 | B2 | 9/2017 | Grabau et al. |
| 10,443,562 | B2 | 10/2019 | Corten |
| 2004/0037162 | A1 | 2/2004 | Flohr et al. |
| 2007/0235590 | A1 | 10/2007 | Kokoshkin et al. |
| 2009/0087314 | A1 | 4/2009 | Haag |
| 2012/0257979 | A1 | 10/2012 | Jensen et al. |
| 2012/0282105 | A1 | 11/2012 | Grife et al. |
| 2014/0328692 | A1 | 11/2014 | Riddell et al. |
| 2015/0204306 | A1* | 7/2015 | Herr ............... F03D 7/0232 416/23 |
| 2015/0322791 | A1* | 11/2015 | Flach ............... F03D 1/0675 156/60 |
| 2016/0215758 | A1 | 7/2016 | Corten |
| 2017/0218916 | A1* | 8/2017 | Lehmann Madsen ................ F03D 1/0641 |
| 2018/0347540 | A1 | 12/2018 | Hurault et al. |
| 2019/0120204 | A1 | 4/2019 | Harada |

FOREIGN PATENT DOCUMENTS

| | | |
|---|---|---|
| EP | 2824320 A1 | 1/2015 |
| EP | 2739529 B1 | 9/2015 |
| EP | 2736805 B1 | 6/2017 |
| JP | H0970644 A | 3/1997 |
| JP | 2004069061 A | 3/2004 |
| JP | 2019078191 A | 5/2019 |
| JP | 2020105998 A | 7/2020 |
| WO | 2006122547 A1 | 11/2006 |
| WO | 2014198353 A1 | 12/2014 |
| WO | 2015030573 A1 | 3/2015 |

OTHER PUBLICATIONS

International Search Report of PCT/JP2021/043327 dated Jan. 25, 2022; 12pp.

Office Action for Japanese Application No. 2020-197391 mailed Oct. 5, 2021; 12pp.

European Search Report of European Application No. 21898074.6 dated Mar. 21, 2024.

* cited by examiner

VORTEX GENERATOR FOR WIND TURBINE BLADE, WIND TURBINE BLADE AND WIND POWER GENERATING APPARATUS, AND METHOD FOR MANUFACTURING WIND TURBINE BLADE

RELATED APPLICATIONS

The present application is a National Phase of International Application Number PCT/JP2021/043327 filed Nov. 26, 2021 and claims priority from Japanese Application Number 2020-197391 filed Nov. 27, 2020.

TECHNICAL FIELD

The present disclosure relates to a vortex generator for wind turbine blade, a wind turbine blade and a wind power generating apparatus, and a method for manufacturing the wind turbine blade.

This application claims the priority of Japanese Patent Application No. 2020-197391 filed on Nov. 27, 2020, the content of which is incorporated herein by reference.

BACKGROUND

Conventionally, approaches to improve aerodynamic performance of a wind turbine blade have been sought with the object of improving operation efficiency of a wind turbine. In one of the approaches, a vortex generator is disposed on a surface of the wind turbine blade to suppress separation of a flow along the surface of the wind turbine blade.

Patent Documents 1 to 8 disclose a vortex generator which includes a platform mounted on a surface of a wind turbine blade, and a fin disposed upright on the platform.

CITATION LIST

Patent Literature

Patent Document 1: EP2484898A
Patent Document 2: WO2015/030573A
Patent Document 3: DE102013201871A
Patent Document 4: WO2014/198353A
Patent Document 5: EP2824320A
Patent Document 6: EP2739529A
Patent Document 7: WO2006/122547A
Patent Document 8: EP2736805A

SUMMARY

Technical Problem

Meanwhile, a vortex generator tends to increase in size as a wind turbine blade increases in size, and a wall thickness of a fin tends to increase. Thus, a sink mark due to shrinkage occurs during a cooling process when the vortex generator is molded, and distortion or a dent is likely to occur. In this case, a vortex generator having a shape as designed cannot be obtained and when this vortex generator is installed on a wind turbine blade, an expected function or performance may not be obtained.

In view of the above, an object of at least one embodiment of the present invention is to provide the vortex generator for wind turbine blade where the vortex generator having the shape as designed is easily obtained, the wind turbine blade and the wind power generating apparatus, and the method for manufacturing the wind turbine blade.

Solution to Problem

A vortex generator for wind turbine blade according to at least one embodiment of the present invention is a vortex generator for wind turbine blade, the vortex generator being made of a resin, including: a platform; and at least one fin disposed projecting from an upper surface of the platform. The vortex generator includes a cavity that opens to a bottom surface of the platform and extends to an inside of the fin.

A wind turbine blade according to at least one embodiment of the present invention, includes: a blade body; and the above-described vortex generator attached to a surface of the blade body.

A wind power generating apparatus according to at least one embodiment of the present invention, includes: a wind turbine rotor including the above-described wind turbine blade; and a generator configured to be driven by the wind turbine rotor.

A method for manufacturing a wind turbine blade according to at least one embodiment of the present invention is a method for manufacturing a wind turbine blade including a blade body, and the above-described vortex generator which includes a hole disposed in the fin, and communicating with the cavity as well as opening to a surface of the fin, including: a step of adhering the vortex generator to a surface of the blade body; and a step of sucking internal air of the cavity via the hole.

Advantageous Effects

According to at least one embodiment of the present invention, provided are a vortex generator for a wind turbine blade where a vortex generator having a shape as designed is easily obtained, a wind turbine blade and a wind power generating apparatus, and a method for manufacturing the wind turbine blade.

DETAILED DESCRIPTION

Figure 1:
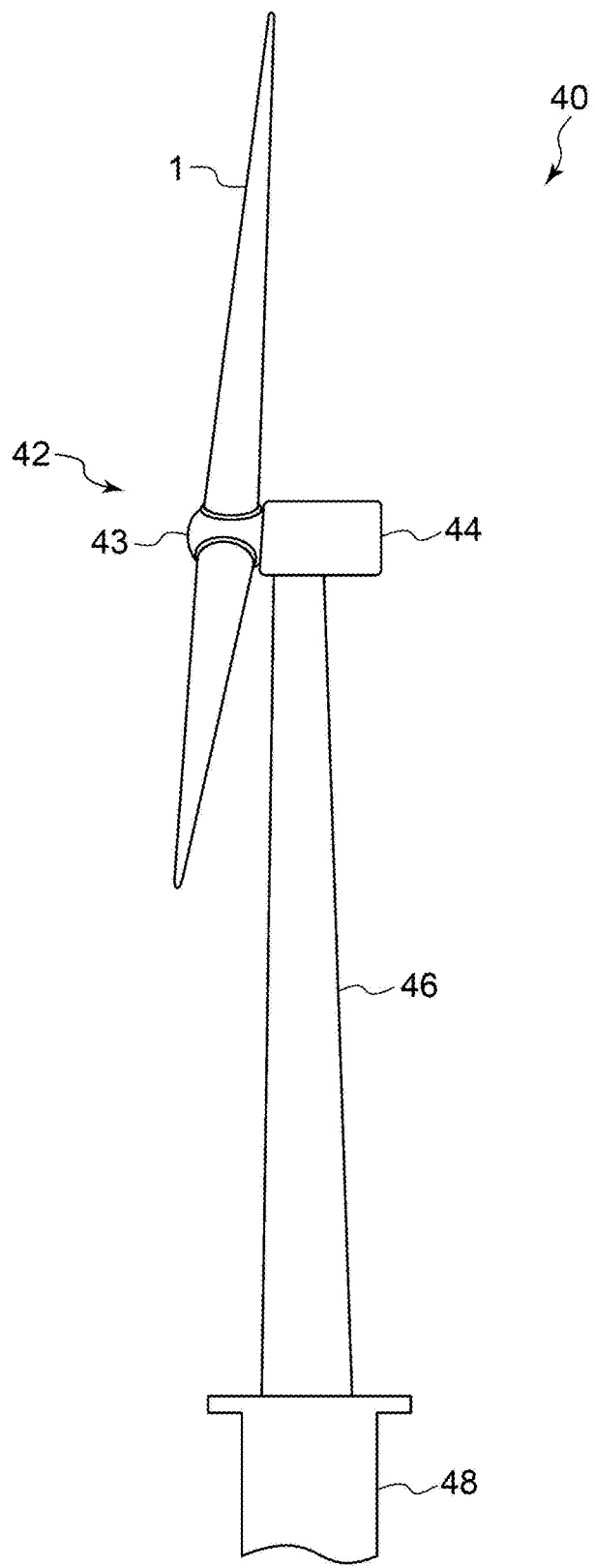
FIG. 1 is a schematic configuration view of a wind power generating apparatus according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.
(Configuration of Wind Power Generating Apparatus)

Figure 2:
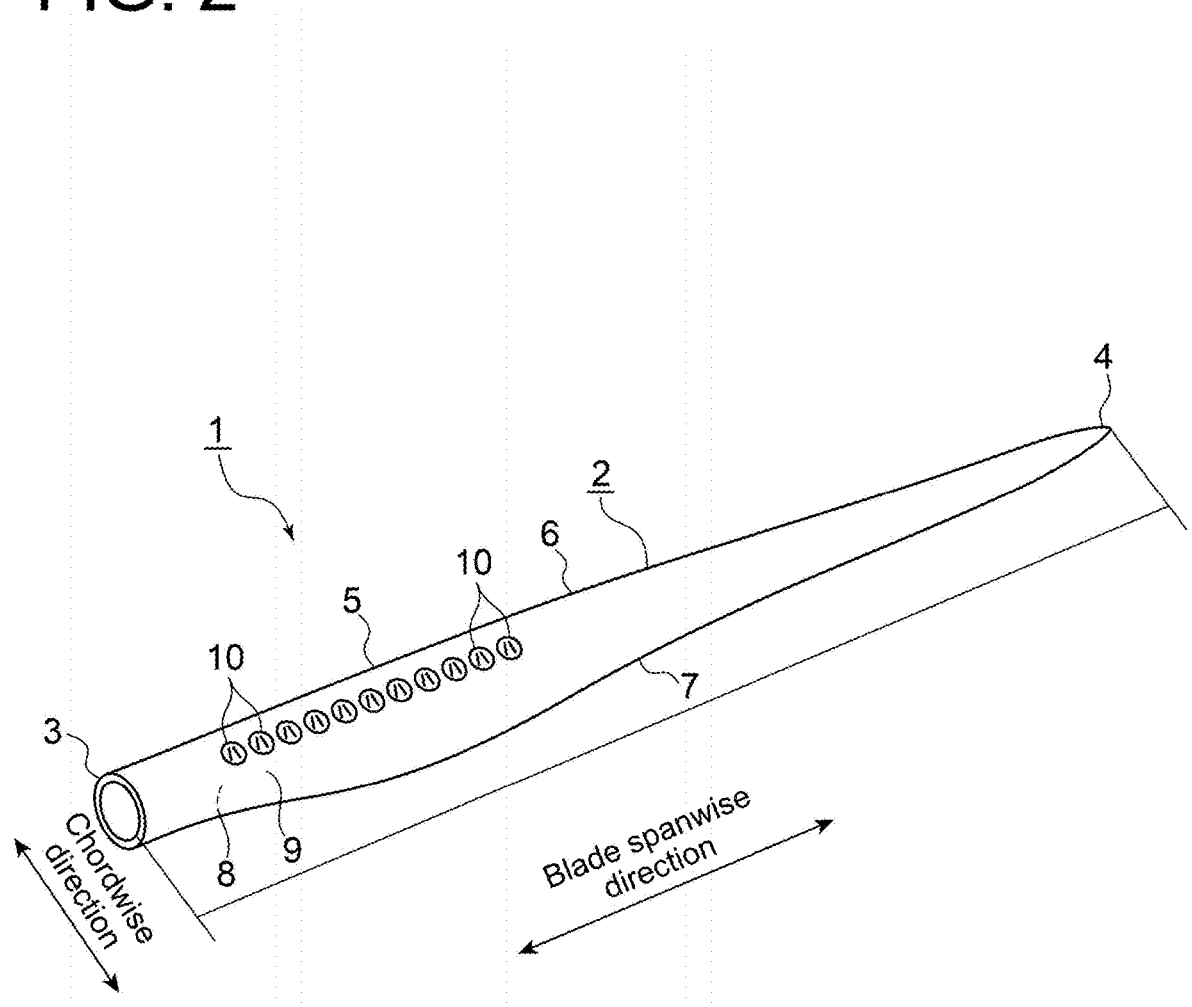
FIG. 2 is a perspective view of a wind turbine blade according to an embodiment.

First, with reference to FIGS. 1 and 2, the overall configuration of a wind power generating apparatus and a wind turbine blade to which a vortex generator is applied according to some embodiments will be described. FIG. 1 is a schematic configuration view of the wind power generating apparatus according to an embodiment, and FIG. 2 is a perspective view of the wind turbine blade according to an embodiment.

As shown in FIG. 1, a wind power generating apparatus 40 includes a rotor 42 composed of at least one (for example, three) wind turbine blade 1 and a hub 43. It is configured such that the wind turbine blade 1 is radially mounted on the hub 43, the rotor 42 is rotated by receiving wind with the wind turbine blade 1, and electricity is generated by a generator (not shown) connected to the rotor 42.

In the embodiment shown in FIG. 1, the rotor 42 is supported by a nacelle 44 disposed on an upper side of a tower 46. Further, the tower 46 is disposed upright on a base structure 48 (a foundation structure, a floating structure, or the like) disposed on water or on land.

As described below, a vortex generator according to an embodiment is attached to the wind turbine blade 1 of the wind power generating apparatus 40.
(Configuration of Wind Turbine Blade)

As shown in FIG. 2, the wind turbine blade 1 includes a blade body 2, and vortex generators 10 disposed on the surface of the blade body 2 (blade surface).

The blade body 2 includes a blade root 3 mounted on the hub 43 of the wind power generating apparatus 40, a blade tip 4 located farthest from the hub 43, and an airfoil portion 5 extending between the blade root 3 and the blade tip 4. Further, the wind turbine blade 1 has a leading edge 6 and a trailing edge 7 from the blade root 3 to the blade tip 4. Furthermore, an exterior shape of the wind turbine blade 1 is formed by a pressure surface (concave surface) 8 and a suction surface (convex surface) 9 disposed opposite to the pressure surface 8.

In the wind turbine blade 1 shown in FIG. 2, the plurality of the vortex generators are attached to the suction surface 9 of the blade body 2. Further, the plurality of vortex generators 10 are arranged on the suction surface 9 of the blade body 2 in a blade spanwise direction.

Hereinafter, in the present specification, the "blade spanwise direction" refers to a direction connecting the blade root 3 and the blade tip 4.
(Configuration of Vortex Generator)

Next, the vortex generator 10 according to some embodiments will be described in detail with reference to FIGS. 3 to 10.

Figure 3:
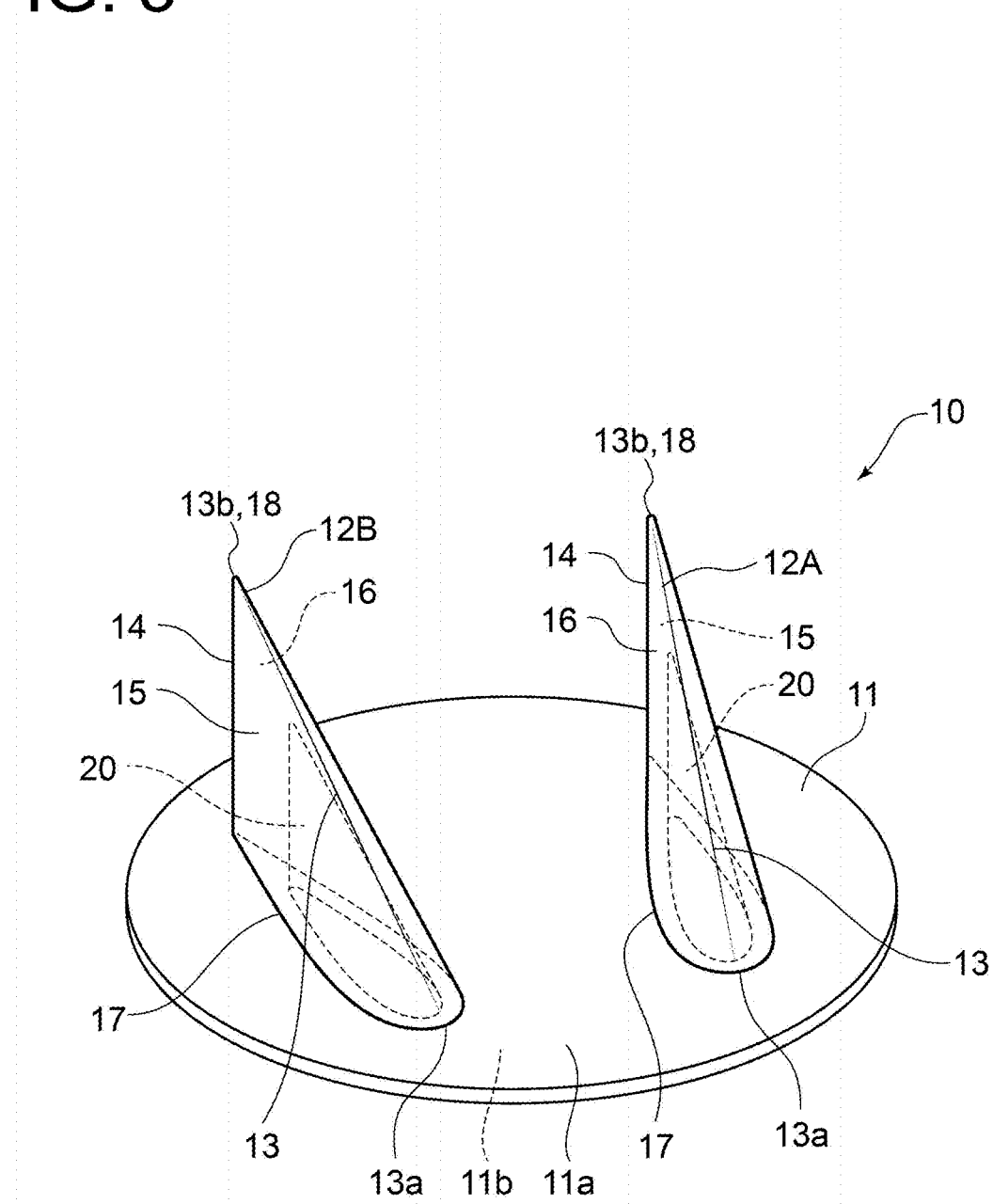
FIG. 3 is a perspective view of a vortex generator according to an embodiment.
Figure 4:
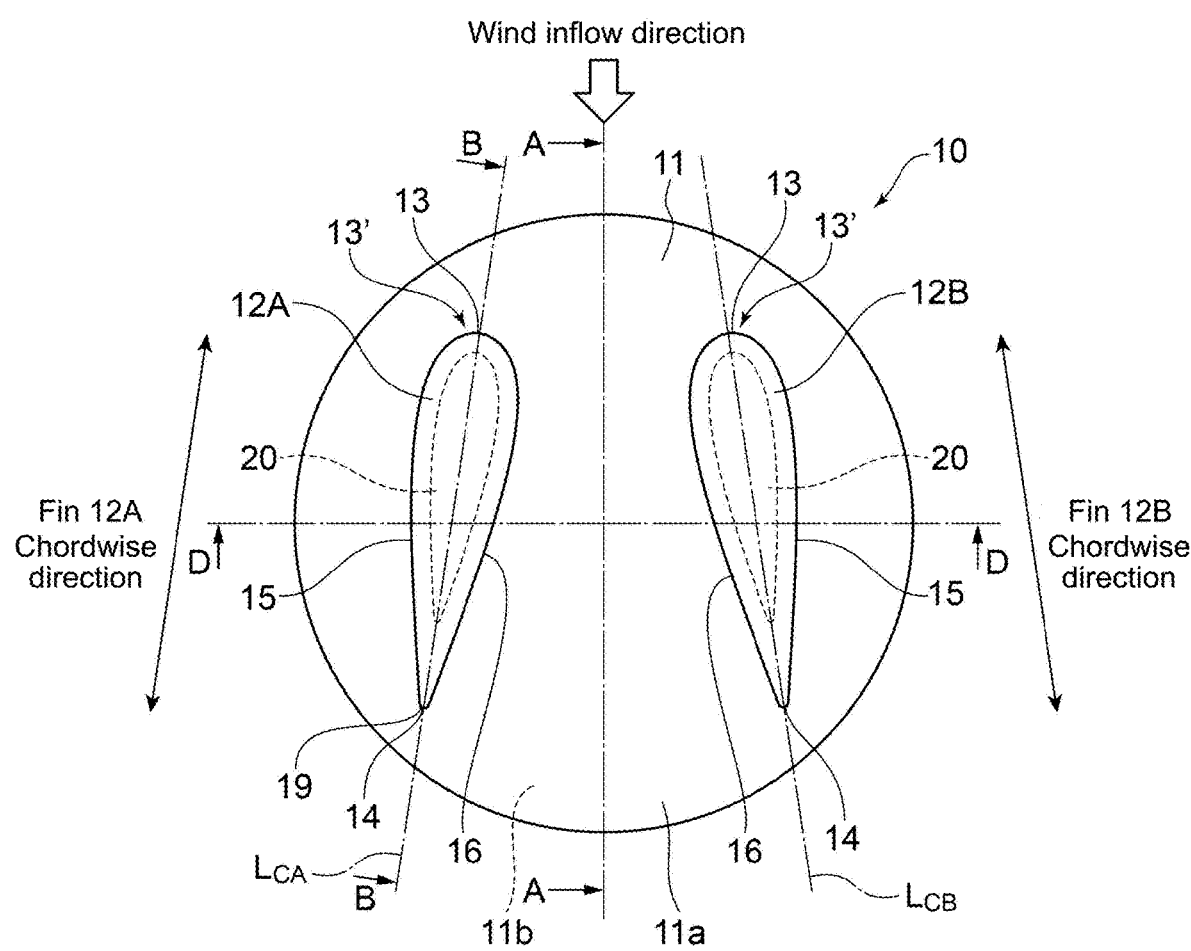
FIG. 4 is a plan view of the vortex generator shown in FIG. 3.
Figure 5:
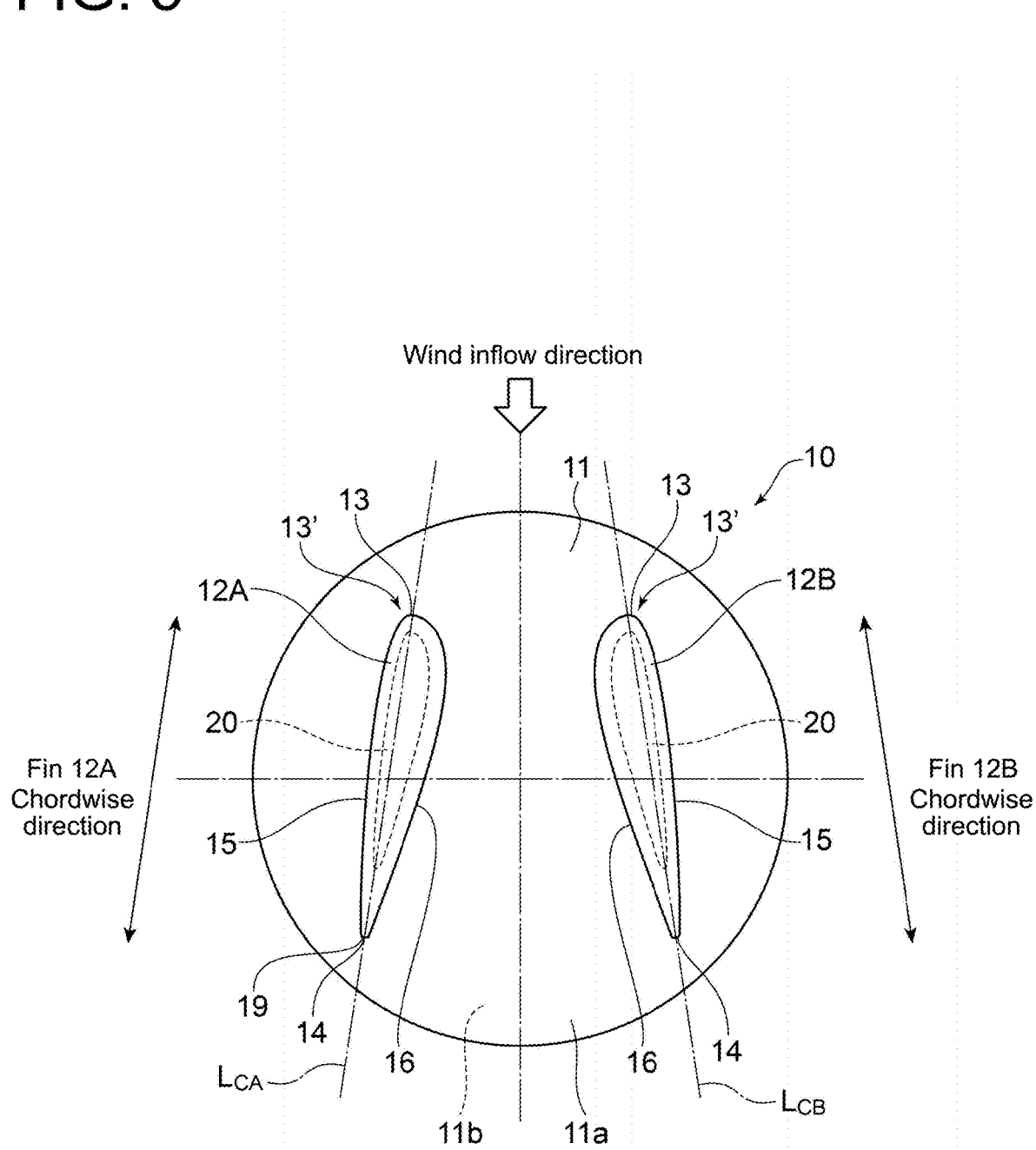
FIG. 5 is a plan view of the vortex generator according to an embodiment.
Figure 6:
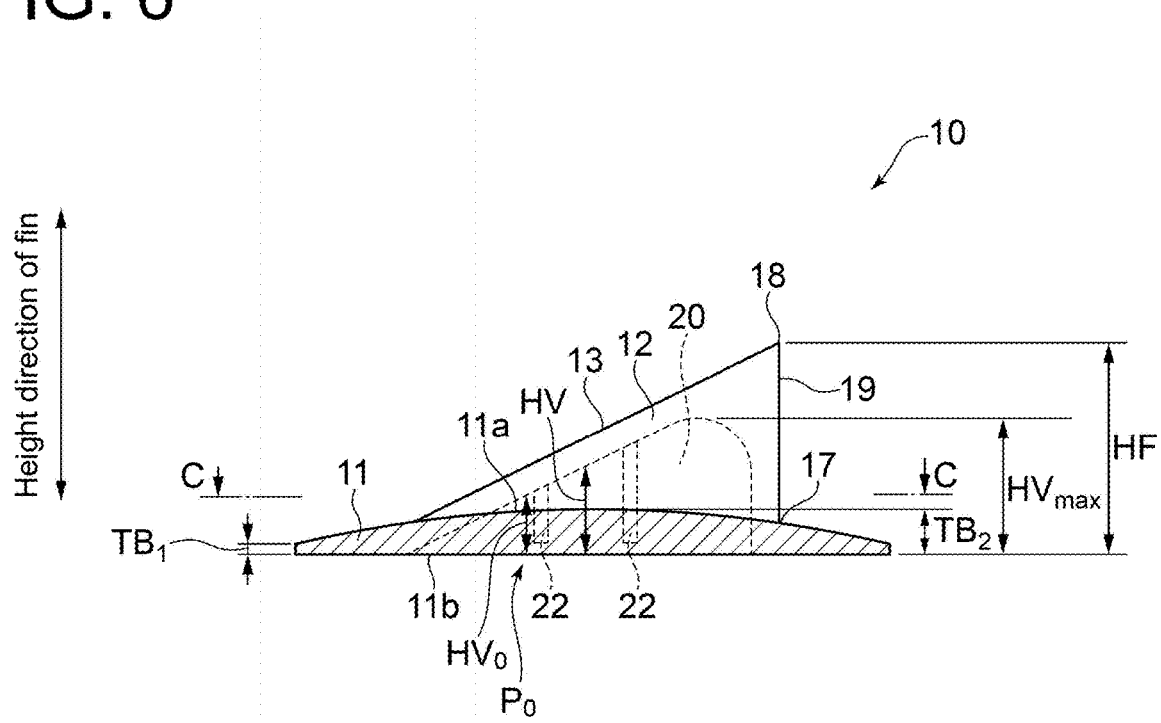
FIG. 6 is a view showing a cross section taken along line A-A in FIG. 4.
Figure 7:
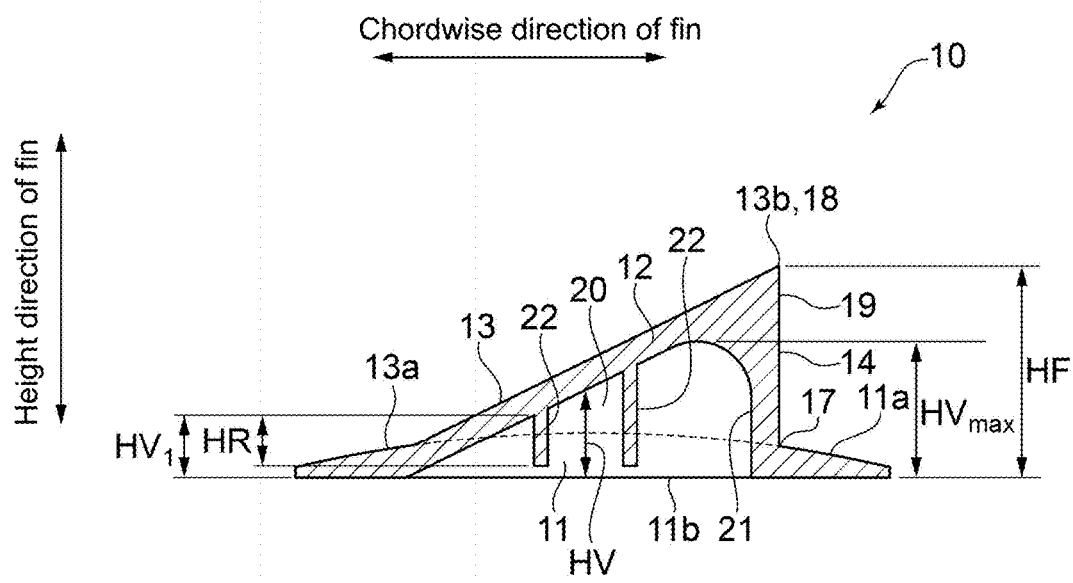
FIG. 7 is a view showing a cross section taken along line B-B in FIG. 4.
Figure 8:
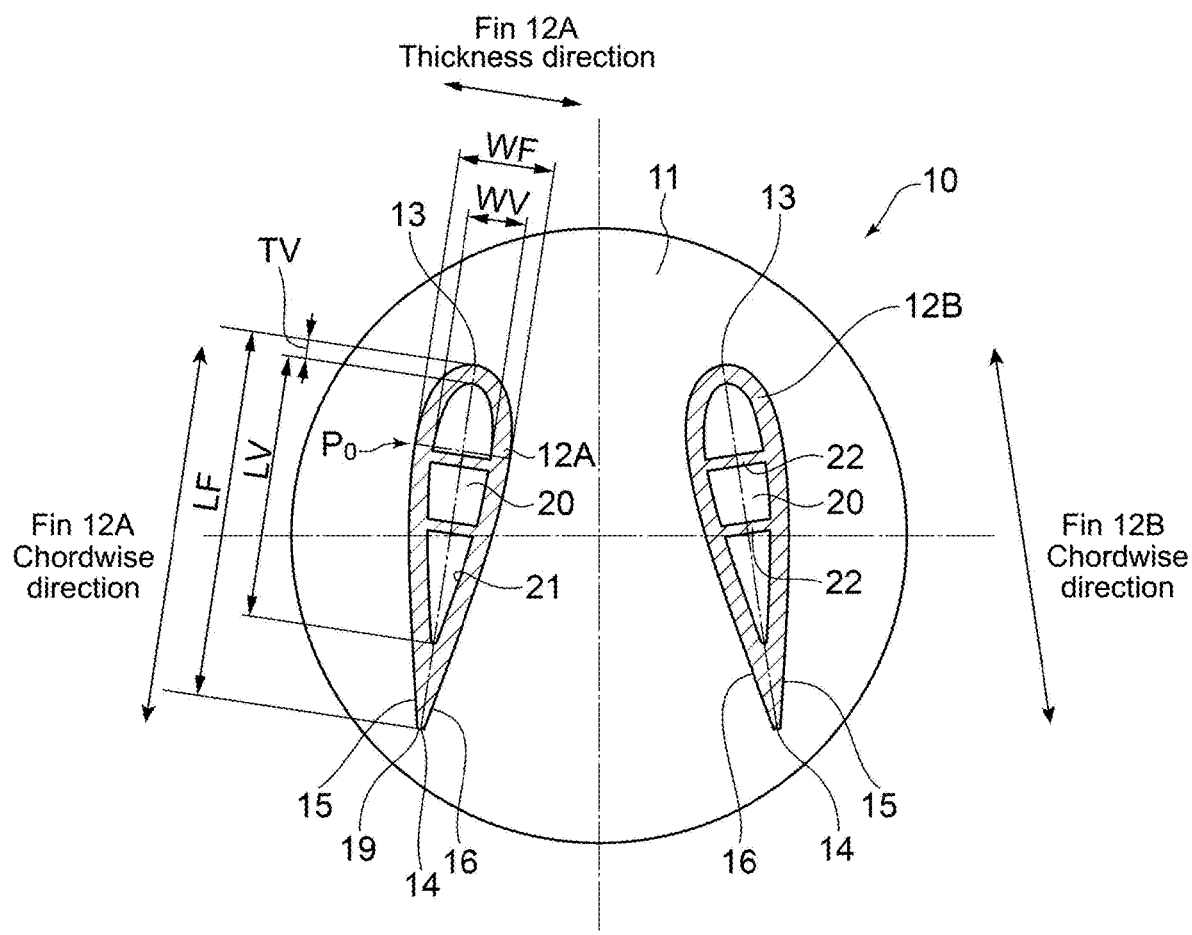
FIG. 8 is a view showing a cross section taken along line C-C in FIG. 6.
Figure 9:
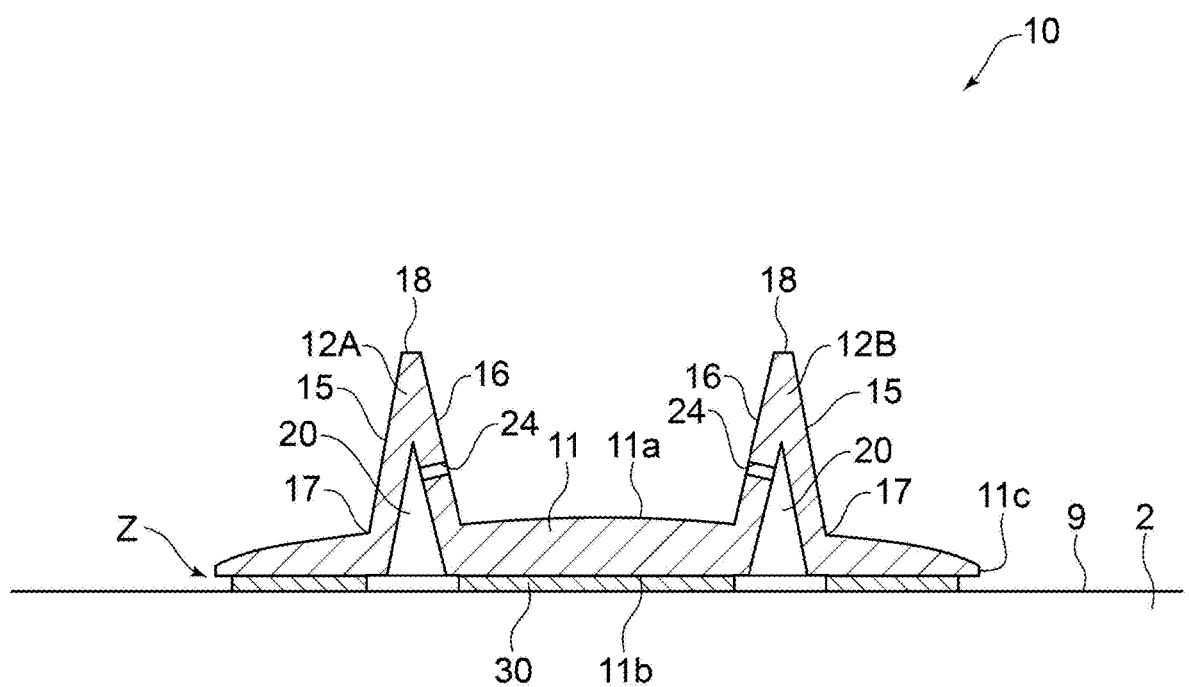
FIG. 9 is a view showing an example of a cross section taken along line D-D in FIG. 4.
Figure 10:
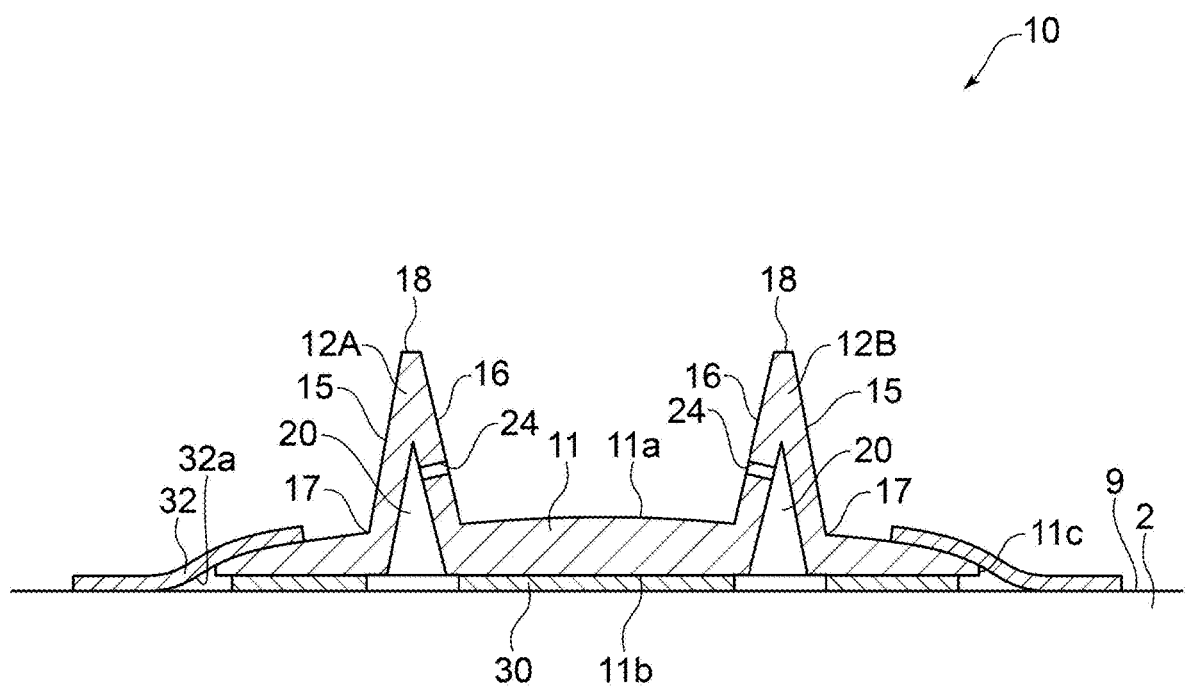
FIG. 10 is a view showing an example of the cross section taken along line D-D in FIG. 4.

FIG. 3 is a perspective view of the vortex generator 10 according to an embodiment, and FIGS. 4 and 5 are each a plan view of the vortex generator according to an embodiment. FIG. 4 is a plan view of the vortex generator 10 shown in FIG. 3. FIGS. 6 to 9 are each a cross-sectional view of the vortex generator 10 according to an embodiment. FIG. 6 is a view showing a cross section taken along line A-A in FIG. 4, FIG. 7 is a view showing a cross section taken along line B-B in FIG. 4, FIG. 8 is a view showing a cross section taken along line C-C in FIG. 6, and FIGS. 9 and 10 are each a view showing a cross section taken along line D-D in FIG. 4. Further, FIGS. 9 and 10 are each a view showing the vortex generator together with the wind turbine blade where the vortex generator is attached according to an embodiment.

As shown in FIGS. 3 to 5, the vortex generator 10 includes a platform 11 mounted on a surface of the wind turbine blade 1 (more specifically, a surface of the blade body 2), and at least one fin 12 disposed on the platform 11.

The platform 11 has an upper surface 11a where the fin 12 is disposed, and a bottom surface 11b opposite to the upper surface 11a. The vortex generator 10 is attached to the surface (for example, the suction surface 9) of the blade body 2 via the bottom surface 11b. The shape of the platform 11 is not particularly limited, but in some embodiments, the shape of the platform 11 may be circular in plan view as shown in FIGS. 3 to 5. In some embodiments, the platform 11 may have a shape such as a polygon or an ellipse in plan view. Further, the upper surface 11a of the platform 11 may have a curved shape or may have a planar shape. The upper surface 11a of the platform 11 shown in FIGS. 6 and 7 has a convex curved shape projecting in a direction from the bottom surface 11b toward the upper surface 11a. The bottom surface 11b of the platform 11 basically has a planar shape, but may not have a perfectly planar shape and may have, for example, a concave curved shape with a relatively large curvature.

The at least one fin 12 is disposed projecting from the upper surface 11a of the platform 11. In the illustrated embodiment, two fins 12A, 12B are disposed on the platform 11. Hereinafter, the fins 12A, 12B are collectively referred to as the fin 12.

As shown in FIGS. 3 to 5, the fin 12 has a leading edge 13 located upstream in a wind inflow direction, a trailing edge 14 located downstream in the wind inflow direction, a pressure surface (concave surface) 15 of the fin 12 facing upstream in the wind inflow direction, and a suction surface (convex surface) 16 of the fin 12 facing downstream in the wind inflow direction. In the fin 12, a direction of straight lines ($L_{CA}$ and $L_{CB}$ in FIGS. 4 and 5) each connecting the leading edge 13 and the trailing edge 14 is a chordwise direction of the fin 12. Further, the fin 12 extends between a top portion 18 and a base portion 17 connected to the platform 11, in a height direction of the fin 12.

The height direction of the fin 12 in the present specification is a direction orthogonal to the bottom surface 11b of the platform 11. Alternatively, if the bottom surface 11b of the platform does not have a planar shape, the height direction of the fin 12 is a direction orthogonal to a plane including an edge of the bottom surface 11b of the platform 11. Hereinafter, the height direction of the fin 12 may simply be referred to as the height direction. Further, in the following description, a height from the bottom surface 11b of the platform 11 means a height from the plane including the edge of the bottom surface 11b of the platform 11, if the bottom surface 11b of the platform does not have the planar shape.

Herein, the effect of the vortex generator 10 will briefly be described.

Separation of a flow on the suction surface 9 of the wind turbine blade 1 is caused by gradually thickening a boundary layer from a streamline flow region in the vicinity of the leading edge 6 toward a turbulent flow region downstream thereof, and separating the flow before arriving at the trailing edge 7.

The vortex generator 10 attached to the wind turbine blade 1 generates a longitudinal vortex on the suction surface 16 side of the fin 12 with a lift produced by the fin 12. Further, a flow flowing into the fin 12 forms a longitudinal vortex along an edge extending from a most upstream position 13a toward a top portion 13b of the leading edge 13 of the fin 12. The longitudinal vortex thus generated by the fin 12 promotes momentum exchange in the height direction of the fin 12 between the inside and the outside of the boundary layer on the wind turbine blade 1 surface, on a wake side of the vortex generator 10. Thus, the boundary phase on the surface of the wind turbine blade 1 becomes thin, suppressing the separation of the flow from the wind turbine blade 1 surface.

In some embodiments, for example, as shown in FIGS. 4 and 5, a leading edge portion 13' is provided which has a curved contour in a cross section orthogonal to the height direction of the fin 12.

According to the above-described embodiments, since the leading edge portion 13' of the fin 12 has the curved contour in the cross section orthogonal to the height direction, when the vortex generator 10 is installed on the wind turbine blade 1, it is possible to reduce a resistance to the flow of air flowing into the vortex generator 10 and the performance of the vortex generator 10 can easily be exhibited.

In some embodiments, for example, as shown in FIGS. 4 and 5, the cross-sectional shape of the fin 12 orthogonal to the height direction of the fin 12 may have an airfoil profile.

In the above-described embodiments, since the cross-sectional shape of the fin 12 has the airfoil shape, it is possible to effectively suppress the separation of the flow from the wind turbine blade 1 surface.

In some embodiments, for example, as shown in FIG. 4, the fin 12 has a shape symmetrical with respect to the chord of the fin 12.

According to the above-described embodiments, since the fin 12 has the shape symmetrical with respect to the chord of the fin 12, molding, such as injection molding or the like, becomes easier than in a case where the fin 12 has a shape asymmetrical with respect to the chord.

In the exemplary embodiment shown in FIG. 4, the fin 12 includes the leading edge portion having the curved contour in the cross section orthogonal to the height direction of the fin, and has the airfoil shape which is symmetrical about the chord of the fin 12 (that is, the pressure surface 15 and the suction surface 16 each have a shape symmetrical about the chord of the fin 12, in the cross section orthogonal to the height direction of the fin 12). Further, in the exemplary embodiment shown in FIG. 5, the fin 12 includes the leading edge portion having the curved contour in the cross section orthogonal to the height direction of the fin, and has the airfoil shape which is asymmetrical about the chord of the fin 12 (that is, the pressure surface and the suction surface 16 each have a shape asymmetrical about the chord of the fin 12, in the cross section orthogonal to the height direction of the fin 12).

In some embodiments, the fin 12 is disposed to be inclined at a predetermined angle with respect to the wind inflow direction. In some embodiments, as shown in FIGS. 3 to 5, each of the fins 12A, 12B may be disposed such that a clearance between the pair of fins 12A, 12B widens from upstream toward downstream in the wind inflow direction (that is, from the leading edge 6 side toward the trailing edge 7 side of the wind turbine blade 1 (see FIG. 2). In some embodiments, each of the fins 12A, 12B may be disposed such that the clearance between the pair of fins 12A, 12B widens from downstream toward upstream in the wind inflow direction (that is, from the trailing edge 7 side toward the leading edge 6 side of the wind turbine blade 1 (see FIG. 2).

In some embodiments, a mounting angle (chordwise direction) of the fin 12 (the fin 12A and/or the fin 12B) is not less than 12 degrees and not greater than 18 degrees with respect to the wind inflow direction. By attaching the vortex generator 10 having such fin 12 to the wind turbine blade 1, it is possible to effectively suppress the separation of the flow from the wind turbine blade 1 surface.

In some embodiments, the vortex generator 10 (the platform 11 and the fin 12) is made of a resin. The resin used as the material of the vortex generator 10 may be a thermoplastic such as ASA (acrylate styrene acrylonitrile), AES (acrylonitrile ethylene styrene), or the like.

As shown in FIGS. 3 to 5, the vortex generator 10 includes cavities 20. Each of the cavities 20 is a cavity that opens to the bottom surface 11b of the platform 11 and extends to the inside of the fin 12. That is, the cavity 20 extends, at least partially, over a position range higher than the upper surface 11a of the platform 11, in the height direction of the fin 12.

According to the above-described embodiments, since the vortex generator 10 includes the cavity 20 extending to the inside of the fin 12, a wall thickness of the fin 12 relative to a wall thickness of the platform 11 can be reduced compared to a case where the cavity 20 is not provided. That is, according to the above-described embodiments, it is easy to suppress a sink mark due to shrinkage during a cooling process when the vortex generator 10 is molded from the resin material. Thus, it becomes easier to obtain the vortex generator 10 having the shape as designed. Therefore, for example, when the vortex generator 10 is installed on the wind turbine blade 1, it becomes easier to stably bond the vortex generator 10 to the blade body 2 surface, or it becomes easier to obtain as expected the effect of suppressing the separation of the flow from the surface of the wind turbine blade 1 by the vortex generator 10.

A method for manufacturing the vortex generator 10 is not particularly limited, but the vortex generator 10 may be manufactured by injection molding, for example. A method for forming the cavity 20 is not particularly limited, but the cavity 20 may be formed by using a core, for example, during injection molding.

In some embodiments, in the cavity 20, a maximum value HVmax (see FIG. 6 or 7) of a height HV of the cavity 20 from the bottom surface 11b of the platform 11 is not less than HF/3, where HF (see FIG. 6 or 7) is a distance between the bottom surface 11b of the platform 11 and the top portion 18 of the fin 12 in the height direction of the fin 12. The height HV of the cavity 20 is a distance from the bottom surface 11b of the platform 11 to a surface 21 forming the cavity 20 in the height direction.

The height HV of the cavity 20 at positions of ribs 22 (see FIGS. 6 to 8) described later is defined as the height of the cavity 20 (the distance from the bottom surface 11b of the platform 11 to the surface 21 forming the cavity 20 in the height direction) when it is assumed that the ribs 22 are virtually removed from the vortex generator 10 and the cavity 20 is formed by the continuous smooth surface 21.

According to the above-described embodiments, since the maximum value HVmax of the height of the cavity 20 from the bottom surface 11b is set to not less than HF/3, an area occupied by the cavity 20 in the fin 12 can relatively be large. Thus, it becomes easier to reduce the wall thickness of the fin 12 relative to the wall thickness of the platform 11. Therefore, it is possible to effectively suppress the sink mark due to the shrinkage during the cooling process when the vortex generator 10 is molded, and it becomes easier to obtain the vortex generator 10 having the shape as designed.

The maximum value HVmax of the height of the cavity 20 may be not less than HF/2. In this case, it becomes easier to reduce the wall thickness of the fin 12 relative to the wall thickness of the platform 11. Therefore, it is possible to effectively suppress the sink mark due to the shrinkage during the cooling process when the vortex generator 10 is molded, and it becomes easier to obtain the vortex generator 10 having the shape as designed.

In some embodiments, at a maximum blade thickness position $P_0$ (see FIG. 6) of the fin 12 in the chordwise direction of the fin 12 and at a position where the distance from the bottom surface 11b of the platform 11 is the maximum thickness of the platform 11 in the height direction of the fin 12, the height HV0 (see FIG. 6) of the cavity 20 is not less than a maximum thickness TB 2 (see FIG. 6) of the platform 11. However, the thickness of the platform 11 is measured along the height direction of the fin, which is the direction orthogonal to the bottom surface 11b of the platform 11.

According to the above-described embodiments, since the height of the cavity 20 from the bottom surface 11b at the maximum blade thickness position $P_0$ of the fin 12 in the chordwise direction of the fin 12 is set to not less than the maximum thickness TB 2 of the platform 11, the area occupied by the cavity 20 in the fin 12 can relatively be large. Thus, it becomes easier to reduce the wall thickness of the fin 12 relative to the wall thickness of the platform 11. Therefore, it is possible to effectively suppress the sink mark due to the shrinkage during the cooling process when the vortex generator 10 is molded, and it becomes easier to obtain the vortex generator 10 having the shape as designed. Further, the height HV of the cavity 20 from the bottom surface 11b may be not less than a minimum thickness $TB_1$ of the platform 11.

In some embodiments, within a range where the distance from the bottom surface 11b of the platform 11 in the height direction is not less than the maximum thickness TB 2 of the platform 11 and not greater than HF/3, the cavity 20 is disposed in a region including the maximum blade thickness position $P_0$ (see FIG. 8) of the fin 12 in the chordwise direction of the fin 12, and a length LF (see FIG. 8) of the cavity 20 in the chordwise direction may be at least 30% of a chord length LF (see FIG. 8) of the fin 12.

Alternatively, in some embodiments, within a range where the height HV of the cavity 20 in the height direction from the bottom surface 11b is not less than the maximum thickness of the platform 11 and not greater than HF/5, the length of the cavity 20 in the chordwise direction may be at least 50% of the fin chord length.

The blade thickness of the fin 12 is relatively large in the range where the distance from the bottom surface 11b of the platform 11 in the height direction is not less than HF/3 and not greater than HF/5. In this regard, in the above-described embodiments, since the cavity 20 having the length of at least 30% and at most 50% of the fin chord length is disposed in the region including the maximum blade thickness position $P_0$ in the chordwise direction within the above-described range (that is, within the range in which the blade thickness of the fin 12 is relatively large) in the height direction of the fin 12, the wall thickness of the fin 12 can effectively be reduced within the said range in the height direction. Therefore, it is possible to effectively suppress the sink mark due to the shrinkage during the cooling process when the vortex generator 10 is molded, and it becomes easier to obtain the vortex generator 10 having the shape as designed.

In some embodiments, within a range where the distance from the bottom surface 11b of the platform 11 in the height direction is not less than the maximum thickness TB 2 of the platform 11 and not greater than HF/5, a width WV (see FIG. 8) of the cavity 20 at the maximum blade thickness position $P_0$ of the fin 12 in the chordwise direction of the fin 12 is at least 50% of a blade thickness WF (see FIG. 8) of the fin 12 at the maximum blade thickness position $P_0$.

The blade thickness of the fin 12 is a size of the fin 12 in the thickness direction of the fin 12 orthogonal to the chordwise direction of the fin 12, and the width of the cavity 20 is a size of the cavity 20 in the thickness direction of the fin 12.

According to the above-described embodiments, within the range where the distance from the bottom surface 11b in the height direction is not less than the maximum thickness $TB_2$ of the platform 11 and not greater than HF/5, the cavity 20 has the width WV at the maximum blade thickness position $P_0$ of the fin 12 in the chordwise direction of the fin 12 which is at least 50% of the blade thickness WF of the fin 12 at the maximum blade thickness position $P_0$. Thus, it is easy to reduce the wall thickness of the fin 12 at the maximum blade thickness position $P_0$ of the fin 12, within the above-described range in the height direction. Therefore, it is possible to effectively suppress the sink mark due to the shrinkage during the cooling process when the vortex generator 10 is molded, and it becomes much easier to obtain the vortex generator 10 having the shape as designed.

In some embodiments, in at least 50% of an extension range of the cavity 20 in the height direction of the fin 12, a wall thickness TV (see FIG. 8) of the fin 12 at the position of the leading edge 13 of the fin 12 and in the chordwise direction of the fin 12 is at least 0.5 and at most 2.0 times an average $((TB_1+TB_2)/2)$ of the maximum thickness $TB_2$ and the minimum thickness $TB_1$ of the platform 11.

In the above-described embodiments, since the wall thickness TV at the position of the leading edge 13 of the fin 12 is at least 0.5 times the average of the maximum thickness TB 2 and the minimum thickness $TB_1$ of the platform 11 within the range in the height direction described above, it is possible to suppress a decrease in strength of the vortex generator 10 due to the provision of the cavity 20 in the fin 12. Further, since the wall thickness TV at the position of the leading edge 13 of the fin 12 is at most 2.0 times the average of the maximum thickness TB 2 and the minimum thickness $TB_1$ of the platform 11 within the range in the height direction described above, the wall thickness TV at the position of the leading edge 13 of the fin 12 is made relatively thin, making it possible to effectively suppress the sink mark due to the shrinkage during the cooling process when the vortex generator 10 is molded. Thus, it is possible to obtain the vortex generator 10 having the shape as designed, while suppressing the decrease in strength of the vortex generator.

In an embodiment, as already described, the fin 12 may include the leading edge portion 13' having the curved contour in the cross section orthogonal to the height direction. As shown in FIG. 4, the leading edge portion 13' of the fin 12 having the symmetrical shape with respect to the chord of the fin 12 has the curved contour. Further, as shown in FIG. 5, the leading edge portion 13' of the fin 12 having the asymmetrical shape with respect to the chord of the fin 12 also has the curved contour.

According to the above-described embodiment, when the vortex generator 10 is installed on the wind turbine blade 1, it is possible to reduce the resistance to the flow of air flowing into the vortex generator 10 and the performance of the vortex generator 10 can easily be exhibited. The fin 12 may have the airfoil shape.

In an embodiment, as shown in FIG. 4, the fin 12 may have the shape symmetrical with respect to the chord of the fin 12.

According to the above-described embodiment, since the fin 12 has the shape symmetrical with respect to the chord of the fin 12, molding becomes easier than in the case where the fin 12 has the shape asymmetrical with respect to the chord. For example, if the vortex generator 10 is molded by injection molding, since the fin 12 has the symmetrical shape, the vortex generator 10 is easily removed from a mold.

In some embodiments, as shown in FIG. 5, the fin 12 may have the shape asymmetrical with respect to the chord of the fin 12.

As shown in FIGS. 6 to 8, in an embodiment, the ribs 22 are provided which extend inside the cavity 20 and along the thickness direction of the fin 12.

If the cavity 20 is disposed inside the fin 12, the fin 12 is easily deformed toward the thickness direction of the fin 12, resulting in the fin 12 being deformed and the platform 11 also easily being deformed along the thickness direction of the fin 12. In this regard, according to the above-described embodiment, since the ribs 22 extending along the thickness direction of the fin 12 are disposed inside the cavity 20, it is possible to suppress the deformation in the fin 12 in the thickness direction of the fin 12. Thus, it is also possible to suppress the deformation in the platform 11 associated with the deformation in the fin 12 described above. Therefore, it becomes much easier to obtain the vortex generator 10 having the shape as designed.

The ribs 22 may integrally be formed with the vortex generator 10 having the cavity 20, such as by injection molding. Alternatively, the ribs 22 may be installed inside the cavity 20 after the fin 12 of the vortex generator 10 having the cavity 20 is molded.

At least one or two ribs 22 may be disposed in the cavity 20. In the exemplary embodiments shown in FIGS. 6 to 8, in the cavity 20, the two ribs are respectively disposed at positions spaced apart from each other in the chordwise direction of the fin 12. In some embodiments, the ribs 22 extend along the height direction of the fin 12 over at least 70% of the extension range of the cavity 20 in the height direction of the fin 12. In the above-described embodiments, a height HR (see FIG. 7) of the rib 22 is set at at least 70% of the extension range of the cavity 20 in the height direction of the fin 12 (a height $HV_1$ of the cavity 20 at the position of the rib 22). That is, since the rib 22 extends along the height direction of the fin 12 over at least 70% of the extension range of the cavity 20 in the height direction of the fin 12, it is possible to effectively suppress the deformation in the fin 12 in the thickness direction of the fin 12. Thus, it is also possible to effectively suppress the deformation in the platform 11 associated with the deformation in the fin 12. Therefore, it becomes much easier to obtain the vortex generator 10 having the shape as designed. The height HR of the rib 22 is the length of the rib 22 in the height direction of the fin 12.

In some embodiments, at least one of the ribs 22 is disposed at a position where the distance from the leading edge 13 in the chordwise direction of the fin 12 is not greater than LF/2 (half the chord length), at the position where the distance from the bottom surface 11b of the platform 11 in the height direction of the fin 12 is the maximum thickness of the platform 11.

According to the above-described embodiments, since the rib 22 is disposed in the region on the leading edge side where the blade thickness of the fin 12 is relatively large, it is possible to effectively suppress the deformation in the platform 11 associated with the deformation in the fin 12. Therefore, it becomes much easier to obtain the vortex generator 10 having the shape as designed.

In some embodiments, for example, as shown in FIGS. 9 and 10, the vortex generator 10 includes a hole 24 which is disposed in the fin 12 and communicates with the cavity 20 as well as opens to the surface (the suction surface 16 in FIGS. 9 and 10) of the fin. The hole 24 is a hole which opens to the fin 12 surface on one end side and opens to the surface 21 forming the cavity 20 on another end side.

According to the above-described embodiments, since the fin 12 includes the hole 24 which communicates with the cavity 20 and opens to the surface of the fin 12, for example, by connecting an air suction device (not shown) to the hole 24, air in cavity 20 can be evacuated via the hole 24. By evacuating the air in the cavity 20 via the hole 24, a pressing force against the wind turbine blade 1 can be applied to the vortex generator 10, making it possible to easily attach the vortex generator to the wind turbine blade 1.

In some embodiments, as shown in FIGS. 9 to 10, the hole 24 is disposed in the suction surface 16 of the fin 12. In some embodiments, the hole 24 may be disposed in the pressure surface 15 of fin 12. In this case, processing work for forming the hole 24 is performed easily. In some embodiments, the hole 24 may be disposed in a rear end surface 19 (see FIGS. 4 and 8) including the trailing edge 14 of fin 12. In this case, it is possible to suppress deterioration in aerodynamic performance of the vortex generator 10 due to providing the hole in the fin 12.

As shown in FIGS. 9 and 10, the vortex generator 10 may be adhered to the blade body 2 with an adhesive material 30 (for example, a double-sided tape, an adhesive agent, or the like). In this case, a step Z (see FIG. 9) is generated between the platform 11 and the surface of the blade body 2. Therefore, as shown in FIG. 10, a tape 32 may be adhered to the upper surface 11a of the platform 11 in the vortex generator 10 and the surface of the blade body 2 so as to cover an edge 11c of the platform 11. That is, the wind turbine blade 1 according to some embodiments includes the tape 32 which has an adhesive surface 32a adhered to the upper surface 11a of the platform 11 in the vortex generator 10 and the surface (for example, the suction surface 9) of the blade body 2 so as to cover the edge 11c of the platform 11.

By providing the above-described tape 32, it is possible to reduce the step between the surface of the blade body 2 and the platform 11. As a result, it becomes easier to prevent the separation of the vortex generator 10 from the wind turbine blade 1. Alternatively, since the above-described step is reduced, it is possible to suppress separation of the air flow due to the step.

(Method for Manufacturing Wind Turbine Blade)

Next, a method for manufacturing the wind turbine blade 1 (or a method for attaching the vortex generator 10 to the wind turbine blade 1) according to an embodiment will be described with reference to FIGS. 9 and 10.

In an embodiment, first, the vortex generator 10 is adhered to the surface (for example, the suction surface 9) of the blade body 2. At this time, for example, as shown in FIG. 9, the bottom surface 11b of the vortex generator 10 and the surface of the blade body 2 are adhered with the adhesive material 30 (the double-sided tape, the adhesive agent, or the like).

Next, as shown in FIG. 10, the tape 32 is applied to the upper surface 11a of the platform 11 in the vortex generator 10 and the surface of the blade body 2 so as to cover the edge 11c of the platform 11. By thus providing the tape 32, it is possible to reduce the step Z (see FIG. 9) between the surface of the blade body 2 and the platform 11.

Further, the internal air of the cavity 20 is sucked via the hole 24 of the vortex generator 10. This operation is performed by, for example, connecting the air suction device to the hole 24. By sucking the internal air of the cavity 20 via the hole 24 of the fin 12, a sufficient pressing force can easily be applied to the vortex generator 10 when the vortex generator 10 is attached to the blade body 2. Thus, the vortex generator 10 can appropriately be attached to the blade body 2 with easy construction work. For example, even with the wind turbine blade 1 mounted on the existing wind power generating apparatus 40, the pressing force can easily be applied to the vortex generator 10 adhered to the surface of the blade body 2. Thus, it becomes easy to attach the vortex generator 10 to the existing wind turbine blade 1.

The contents described in the above embodiments would be understood as follows, for instance.

(1) A vortex generator (10) for wind turbine blade according to at least one embodiment of the present invention is a vortex generator for wind turbine blade, the vortex generator being made of a resin, including: a platform (11); and at least one fin (12) disposed projecting from an upper surface of the platform. The vortex generator includes a cavity 20 that opens to a bottom surface (11b) of the platform and extends to an inside of the fin.

With the above configuration (1), since the vortex generator includes the cavity extending to the inside of the fin, the wall thickness of the fin relative to the wall thickness of the platform can be reduced. That is, with the above configuration (1), it is easy to suppress a sink mark due to shrinkage during a cooling process when the vortex generator is molded from the resin material. Thus, it becomes easier to obtain the vortex generator having the shape as designed.

(2) In some embodiments, in the above configuration (1), a maximum value of a height of the cavity from the bottom surface of the platform is not less than HF/3, where HF is a distance between the bottom surface and a top portion (18) of the fin in a height direction of the fin.

With the above configuration (2), since the maximum value of the height of the cavity from the bottom surface is set to not less than HF/3, an area occupied by the cavity in the fin can relatively be large. Thus, it becomes easier to reduce the wall thickness of the fin relative to the wall thickness of the platform. Therefore, it is possible to effectively suppress the sink mark due to the shrinkage during the cooling process when the vortex generator is molded, and it becomes much easier to obtain the vortex generator having the shape as designed.

(3) In some embodiments, in the above configuration (1) or (2), at a maximum blade thickness position ($P_O$) of the fin in a chordwise direction of the fin and on a plane which includes a position of a maximum thickness of the platform in a height direction of the fin and is parallel to the bottom surface of the platform, a height (HV) of the cavity from the bottom surface is not less than the maximum thickness ($TB_2$) of the platform.

With the above configuration (3), since the height of the cavity from the bottom surface at the maximum blade thickness position of the fin in the chordwise direction of the fin is set to not less than the maximum thickness of the platform, the area occupied by the cavity in the fin can relatively be large. Thus, it becomes easier to reduce the wall thickness of the fin relative to the wall thickness of the platform. Therefore, it is possible to effectively suppress the sink mark due to the shrinkage during the cooling process when the vortex generator is molded, and it becomes much easier to obtain the vortex generator having the shape as designed.

(4) In some embodiments, in the above configurations (1) to (3), within a range in which a distance from the bottom surface of the platform in a height direction of the fin is not less than a maximum thickness of the platform and not greater than HF/3, where HF is a distance between the bottom surface and a top portion of the fin in the height direction, the cavity is disposed in a region including a maximum blade thickness position of the fin in a chordwise direction of the fin, and a length (LV) of the cavity in the chordwise direction is at least 30% of a chord length (LF) of the fin.

The blade thickness of the fin 12 is relatively large in the range where the distance from the bottom surface of the platform in the height direction of the fin is not greater than HF/3. In this regard, with the above configuration (4), within the range where the distance from the bottom surface of the platform in the height direction is not less than the maximum thickness of the platform and not greater than HF/3, the cavity is disposed in the region including the maximum blade thickness position of the fin in the chordwise direction of the fin, and the length of the cavity in the chordwise direction is at least 30% of the chord length of the fin. Thus, within the above-described range in the height direction, it is possible to effectively reduce the wall thickness of the fin. Therefore, it is possible to effectively suppress the sink mark due to the shrinkage during the cooling process when the vortex generator is molded, and it becomes much easier to obtain the vortex generator having the shape as designed.

(5) In some embodiments, in the above configurations (1) to (4), within a range in which a distance from the bottom surface of the platform in a height direction of the fin is not less than a maximum thickness of the platform and not greater than HF/5, where HF is a distance between the bottom surface and a top portion of the fin in the height direction, a width (WV) of the cavity at a maximum blade thickness position of the fin in a chordwise direction of the fin is at least 50% of a blade thickness (WF) of the fin at the maximum blade thickness position.

With the above configuration (5), within the range where the distance from the bottom surface in the height direction is not less than the maximum thickness of the platform and not greater than HF/5, the width of the cavity at the maximum blade thickness position of the fin in the chordwise direction of the fin is at least 50% of the blade thickness of the fin at the maximum blade thickness position. Thus, it is easy to reduce the wall thickness of the fin at the maximum blade thickness position of the fin, within the above-described range in the height direction. Therefore, it is possible to effectively suppress the sink mark due to the shrinkage during the cooling process when the vortex generator is molded, and it becomes much easier to obtain the vortex generator having the shape as designed.

(6) In some embodiments, in the above configurations (1) to (5), in at least 50% of an extension range of the cavity in a height direction of the fin, a wall thickness (TV) of the fin at a position of a leading edge of the fin and in a chordwise direction of the fin is at least 0.5 and at most 2.0 times an average of a maximum thickness ($TB_2$) and a minimum thickness ($TB_1$) of the platform.

In the above configuration (6), since the wall thickness of the fin described above is at least 0.5 times the average of the maximum thickness and the minimum thickness of the platform, it is possible to suppress a decrease in strength of the vortex generator due to the provision of the cavity in the fin. Further, in the above configuration (6), since the wall thickness of the fin described above is at most 2.0 times the average of the maximum thickness and the minimum thickness of the platform, the wall thickness in the leading edge portion of the fin is made relatively thin, making it possible to effectively suppress the sink mark due to the shrinkage during the cooling process when the vortex generator is molded. Thus, with the above configuration (6), it is possible to obtain the vortex generator having the shape as designed, while suppressing the decrease in strength of the vortex generator.

(7) In some embodiments, in the above configurations (1) to (6), the fin includes a leading edge portion (13') having a curved contour in a cross section orthogonal to the height direction.

With the above configuration (7), since the leading edge portion of the fin has the curved contour in the cross section orthogonal to the height direction, when the vortex generator is installed on the wind turbine blade, it is possible to reduce a resistance to the flow of air flowing into the vortex generator and the performance of the vortex generator can easily be exhibited.

(8) In some embodiments, in the above configurations (1) to (7), the fin has a shape symmetrical with respect to a chord of the fin.

With the above configuration (8), since the fin has the shape symmetrical with respect to the chord of the fin, the vortex generator can be molded easily compared to the case where the fin has the shape asymmetrical with respect to the chord.

(9) In some embodiments, in the above configurations (1) to (8), the vortex generator for wind turbine blade includes: a rib (22) extending inside the cavity and along a thickness direction of the fin.

With the above configuration (9), since the rib extending along the thickness direction of the fin is disposed inside the cavity, it is possible to suppress the deformation in the fin in the thickness direction of the fin. Thus, it is also possible to suppress the deformation in the platform associated with the deformation in the fin described above. Therefore, it becomes much easier to obtain the vortex generator having the shape as designed.

(10) In some embodiments, in the above configurations (1) to (9), the rib extends along a height direction of the fin over at least 70% of an extension range of the cavity in the height direction of the fin.

With the above configuration (10), since the above-described rib extends along the height direction of the fin over at least 70% of the extension range of the cavity in the height direction of the fin, it is possible to effectively suppress the deformation in the fin in the thickness direction of the fin. Thus, it is also possible to effectively suppress the deformation in the platform associated with the deformation in the fin described above. Therefore, it becomes much easier to obtain the vortex generator having the shape as designed.

(11) In some embodiments, in the above configurations (1) to (10), the vortex generator for wind turbine includes: a hole (24) disposed in the fin, and communicating with the cavity as well as opening to a surface of the fin.

With the above configuration (11), since the fin includes the hole which communicates with the cavity and opens to the surface of the fin, air in cavity can be evacuated via the hole. Therefore, by evacuating the air in the cavity via the hole, a pressing force against the wind turbine blade can be applied to the vortex generator, making it possible to easily attach the vortex generator to the wind turbine blade.

(12) A wind turbine blade (1) according to at least one embodiment of the present invention, includes: a blade body (2); and the vortex generator (10) according to any one of the above (1) to (11) attached to a surface of the blade body.

With the above configuration (12), since the vortex generator includes the cavity extending to the inside of the fin, the wall thickness of the fin relative to the wall thickness of the platform can be reduced. That is, with the above configuration (12), it is easy to suppress the sink mark due to the shrinkage during the cooling process when the vortex generator is molded from the resin material. Thus, it becomes easier to obtain the vortex generator having the shape as designed.

(13) In some embodiments, in the above configuration (12), the wind turbine blade includes: a tape (32) which has an adhesive surface (32a) adhered to the upper surface (11a) of the platform (11) in the vortex generator and the surface (for example, the suction surface 9) of the blade body so as to cover an edge (11c) of the platform.

With the above configuration (13), since the tape is adhered to the upper surface of the platform in the vortex generator and the surface of the blade body so as to cover the edge of the platform, it is possible to eliminate steps which are generated when the vortex generator and the blade body are adhered. As a result, it becomes easier to prevent the separation of the vortex generator from the wind turbine blade.

(14) A wind power generating apparatus (40) according to at least one embodiment of the present invention, includes: a wind turbine rotor (42) including the wind turbine blade according to the above (12) or (13); and a generator configured to be driven by the wind turbine rotor.

With the above configuration (14), since the vortex generator includes the cavity extending to the inside of the fin, the wall thickness of the fin relative to the wall thickness of the platform can be reduced. That is, with the above configuration (14), it is easy to suppress the sink mark due to the shrinkage during the cooling process when the vortex generator is molded from the resin material. Thus, it becomes easier to obtain the vortex generator having the shape as designed.

(15) A method for manufacturing a wind turbine blade according to at least one embodiment of the present invention is a method for manufacturing a wind turbine blade (1) including a blade body (1) and the vortex generator (10) according to the above (11), including: a step of adhering the vortex generator to a surface (for example, the suction surface 9) of the blade body; and a step of sucking internal air of the cavity (20) via the hole (24).

With the above method (15), since the vortex generator is adhered to the surface of the blade body and the internal air of the cavity is sucked via the hole of the fin, a sufficient pressing force can easily be applied to the vortex generator when the vortex generator is attached to the blade body. Thus, the vortex generator can appropriately be attached to the blade body with easy construction work.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Wind turbine blade
2 Blade body
3 Blade root
4 Blade tip
5 Airfoil portion
6 Leading edge
7 Trailing edge
8 Pressure surface
9 Suction surface
10 Vortex generator
11 Platform
11a Upper surface
11b Bottom surface
11c Edge
12 (12A, 12B) Fin
13 Leading edge
13' Leading edge portion
13a Most upstream position
13b Top portion
14 Trailing edge
15 Pressure surface
16 Suction surface
17 Base portion
18 Top portion
19 Rear end surface
20 Cavity
21 Surface
22 Rib
24 Hole
30 Adhesive material
32 Tape
32a Adhesive surface
40 Wind power generating apparatus
42 Rotor
43 Hub
44 Nacelle
46 Tower
48 Base structure
HR Height of rib
HV Height of cavity
LF Chord length of fin
$P_0$ Maximum blade thickness position of fin
$TB_1$ Minimum thickness of platform
$TB_2$ Maximum thickness of platform
TV Wall thickness of fin
WF Blade thickness of fin
Z Step

The invention claimed is:

1. A vortex generator for a wind turbine blade, the vortex generator being made of a resin, comprising:
a platform; and
at least one fin projecting from an upper surface of the platform,
wherein the vortex generator includes a void cavity that opens to a bottom surface of the platform and extends to an inside of the fin, and
a maximum value of a height of the void cavity from the bottom surface of the platform is not less than HF/3, where HF is a distance between the bottom surface and a top portion of the fin in a height direction of the fin.

2. The vortex generator for the wind turbine blade according to claim 1, wherein, at a maximum blade thickness position of the fin in a chordwise direction of the fin and on a plane which includes a position of a maximum thickness of the platform in a height direction of the fin and is parallel to the bottom surface of the platform, a height of the void cavity from the bottom surface is not less than the maximum thickness of the platform.

3. The vortex generator for wind the turbine blade according to claim 1, wherein, within a range in which a distance from the bottom surface of the platform in a height direction of the fin is not less than a maximum thickness of the platform and not greater than HF/3, where HF is a distance between the bottom surface and a top portion of the fin in the height direction,
the void cavity is disposed in a region including a maximum blade thickness position of the fin in a chordwise direction of the fin, and
a length of the void cavity in the chordwise direction is at least 30% of a chord length of the fin.

4. The vortex generator for the wind turbine blade according to claim 1, wherein, within a range in which a distance from the bottom surface of the platform in a height direction of the fin is not less than a maximum thickness of the platform and not greater than HF/5, where HF is a distance between the bottom surface and a top portion of the fin in the height direction, a width of the void cavity at a maximum blade thickness position of the fin in a chordwise direction of the fin is at least 50% of a blade thickness of the fin at the maximum blade thickness position.

5. The vortex generator for the wind turbine blade according to claim 1, wherein the fin includes a leading edge portion having a curved contour in a cross section orthogonal to a height direction of the fin.

6. The vortex generator for the wind turbine blade according to claim 1, wherein the fin has a shape symmetrical about a chord of the fin.

7. The vortex generator for the wind turbine blade according to claim 1, comprising:
a rib extending inside the void cavity and along a thickness direction of the fin.

8. The vortex generator for the wind turbine blade according to claim 7, wherein the rib extends along a height direction of the fin over at least 70% of an extension range of the cavity in the height direction of the fin.

9. The vortex generator for the wind turbine blade according to claim 1, comprising:
a hole disposed in the fin, and communicating with the void cavity as well as opening to a surface of the fin.

10. A wind turbine blade, comprising:
a blade body; and
the vortex generator according to claim 1 attached to a surface of the blade body.

11. The wind turbine blade according to claim 10, comprising:
a tape which has an adhesive surface adhered to the upper surface of the platform in the vortex generator and the surface of the blade body so as to cover an edge of the platform.

12. A wind power generating apparatus, comprising:
a wind turbine rotor including the wind turbine blade according to claim 10; and
a generator configured to be driven by the wind turbine rotor.

13. A method for manufacturing a wind turbine blade including a blade body and a vortex generator made of a resin, the vortex generator comprising:
a platform;
at least one fin projecting from an upper surface of the platform;
a void cavity that opens to a bottom surface of the platform and extends to an inside of the fin; and
a hole disposed in the fin, and communicating with the void cavity as well as opening to a surface of the fin,
wherein the method comprises a step of adhering the platform of the vortex generator to a surface of the blade body; and
a step of, in a state where the platform is adhered to the surface of the blade body and the void cavity is exposed to the surface of the blade, sucking internal air of the void cavity via the hole.

14. A vortex generator for a wind turbine blade, the vortex generator being made of a resin, comprising:
a platform; and
at least one fin projecting from an upper surface of the platform,
wherein the vortex generator includes a cavity that opens to a bottom surface of the platform and extends to an inside of the fin,
wherein, in at least 50% of an extension range of the cavity in a height direction of the fin, a wall thickness of the fin at a position of a leading edge of the fin and in a chordwise direction of the fin is at least 0.5 and at most 2.0 times an average of a maximum thickness and a minimum thickness of the platform.

* * * * *